(12) United States Patent
Liu et al.

(10) Patent No.: US 12,090,350 B2
(45) Date of Patent: Sep. 17, 2024

(54) FALL PROTECTION LOCKING ASSEMBLY, FALL PROTECTION DEVICE AND FALL PROTECTION SYSTEM

(71) Applicant: FICONT INDUSTRY (BEIJING) CO., LTD., Beijing (CN)

(72) Inventors: Zizhao Liu, Beijing (CN); Zhixin Liu, Beijing (CN); Eugene Wang, Beijing (CN); Yongqiang Song, Beijing (CN)

(73) Assignee: FICONT INDUSTRY (BEIJING) CO., LTD., Beijing (CN)

( * ) Notice: Subject to any disclaimer, the term of this patent is extended or adjusted under 35 U.S.C. 154(b) by 270 days.

(21) Appl. No.: 17/310,320

(22) PCT Filed: Apr. 21, 2020

(86) PCT No.: PCT/CN2020/085755
§ 371 (c)(1),
(2) Date: Jul. 27, 2021

(87) PCT Pub. No.: WO2021/051803
PCT Pub. Date: Mar. 25, 2021

(65) Prior Publication Data
US 2022/0203144 A1 Jun. 30, 2022

(30) Foreign Application Priority Data

Sep. 20, 2019 (CN) .......................... 201921567382.0
Sep. 20, 2019 (CN) .......................... 201921567383.5
(Continued)

(51) Int. Cl.
*A62B 35/00* (2006.01)
*F16D 63/00* (2006.01)

(52) U.S. Cl.
CPC ...... *A62B 35/0068* (2013.01); *A62B 35/0081* (2013.01); *F16D 63/008* (2013.01); *A62B 35/0062* (2013.01)

(58) Field of Classification Search
CPC ............ A62B 35/0068; A62B 35/0081; A62B 35/0062; F16D 63/008
See application file for complete search history.

(56) References Cited

U.S. PATENT DOCUMENTS 4,403,553 A 9/1983 Binder
8,584,797 B2 * 11/2013 Krauss .................... E06C 7/187
182/36

(Continued)

FOREIGN PATENT DOCUMENTS

CN 101095971 A 1/2008
CN 201168358 Y 12/2008
(Continued)

OTHER PUBLICATIONS

Extended European Search Report issued for European Patent Application No. 20866734.5, dated Feb. 28, 2022.
(Continued)

*Primary Examiner* — Eret C McNichols
(74) *Attorney, Agent, or Firm* — Knobbe Martens Olson & Bear LLP

(57) ABSTRACT

The present application relates to the technical field of aerial climbing and transportation operations, and provides a fall protection locking assembly, a fall protection device and a fall protection system. The fall protection locking assembly includes a fixed main body, configured to be installed to a rail through a first wheel body assembly containing a wheel shaft; a lockup member installed on the fixed main body and be switched between a lockup position and a free position; and a first trigger mechanism installed to the fixed main body, the first trigger mechanism includes a transmission (Continued)

member and a drive member, the transmission member is configured to be installed to the wheel shaft and rotate with the wheel shaft, and the transmission member is switched with changes in centrifugal force between a first position, in which the transmission member is disengaged from the drive member in the first position, and a second position, in which the transmission member transmits the rotation of the wheel shaft to the drive member so that the drive member rotates to drive the lockup member to move to the lockup position. When an operator accidentally falls, a wheel shaft will have a higher rotational speed, and then a transmission member will drive the drive member to move together under the action of centrifugal force, thereby driving the lockup member moves to the lockup position to ensure the safety of use.

15 Claims, 11 Drawing Sheets

(30) Foreign Application Priority Data

Sep. 20, 2019 (CN) .......................... 201921567529.6
Mar. 27, 2020 (CN) .......................... 202010231205.6

(56) References Cited

U.S. PATENT DOCUMENTS

| | | | |
|---|---|---|---|
| 10,047,560 B2 * | 8/2018 | Roth | A62B 35/0081 |
| 10,137,323 B2 * | 11/2018 | Roth | A62B 35/0062 |
| 11,420,849 B2 * | 8/2022 | Liu | B66B 1/3492 |
| 11,660,477 B2 * | 5/2023 | Whitty | A62B 35/0068 182/3 |
| 2005/0051659 A1 | 3/2005 | Wolner et al. | |
| 2005/0082115 A1 | 4/2005 | Petzl et al. | |
| 2006/0156944 A1 * | 7/2006 | Vetesnik | A62B 35/0056 104/89 |
| 2006/0283662 A1 * | 12/2006 | Martin | A62B 35/0062 182/8 |
| 2010/0032239 A1 | 2/2010 | Rinklake et al. | |
| 2014/0020983 A1 * | 1/2014 | Casebolt | A62B 35/0081 182/241 |
| 2014/0020988 A1 * | 1/2014 | Casebolt | A62B 1/14 188/65.1 |
| 2015/0129357 A1 * | 5/2015 | Roth | A62B 35/0093 182/5 |
| 2022/0145703 A1 * | 5/2022 | Atkinson | A62B 35/0081 |
| 2023/0064276 A1 * | 3/2023 | Song | A62B 1/10 |

FOREIGN PATENT DOCUMENTS

| | | |
|---|---|---|
| CN | 101688419 A | 3/2010 |
| CN | 101849459 A | 10/2010 |
| CN | 102151369 A | 8/2011 |
| CN | 102600566 A | 7/2012 |
| CN | 202516190 U | 11/2012 |
| CN | 204182046 U | 3/2015 |
| CN | 204293718 U | 4/2015 |
| CN | 104675844 A | 6/2015 |
| CN | 204751795 U | 11/2015 |
| CN | 205031807 U | 2/2016 |
| CN | 205527620 U | 8/2016 |
| CN | 106121314 U | 11/2016 |
| CN | 108434626 A | 8/2018 |
| CN | 208656287 U | 3/2019 |
| CN | 208770711 U | 4/2019 |
| CN | 110081106 A | 8/2019 |
| CN | 110538396 A | 12/2019 |
| CN | 211357511 U | 8/2020 |
| DE | 202006002559 U1 | 4/2006 |
| EP | 0740570 A1 | 11/1996 |
| JP | H08215326 A | 8/1996 |
| WO | WO 95/19204 A1 | 7/1995 |

OTHER PUBLICATIONS

International Search Report for International Patent Application No. PCT/CN2020/085755, dated Jul. 24, 2020 in 8 pages.

* cited by examiner

FALL PROTECTION LOCKING ASSEMBLY, FALL PROTECTION DEVICE AND FALL PROTECTION SYSTEM

CROSS-REFERENCE TO RELATED APPLICATION

The present application claims priority to Chinese patent application No. 2020102312056 filed on Mar. 27, 2020, entitled "Fall Protection Locking Assembly, Fall Protection Device and Fall Protection System", Chinese patent application No. 2019215675296 filed on Sep. 20, 2019, entitled "Slider Rotation Linkage Device", Chinese patent application No. 2019215673835 filed on Sep. 20, 2019, entitled "Fall Protection System" and Chinese patent application No. 2019215673820 filed on Sep. 20, 2019, entitled "Locking Lever Trigger Mechanism of Fall Protection Device", the disclosure of which is hereby incorporated by reference in its entirety.

FIELD OF TECHNOLOGY

The present application relates to the technical field of aerial climbing and transportation operations, in particular to a fall protection locking assembly, a fall protection device and a fall protection system.

BACKGROUND

At present, with the development of society, working in aerial climbing environments and aerial transportation are fairly common. In wind power, construction and other industries, in order to ensure the construction safety of aerial operators, it is necessary to install reliable fall protection apparatus. Rail fall arrester is an important fall protection apparatus that connects dangerous vertical surfaces in the industry and operators. Through the fall protection apparatus, operators may move freely and safely along the rail. In the rail fall arrester in the prior art, a swing lever is adopted as a triggering part of a lockup member. In actual use, the swing lever has the problem of being manipulated incorrectly, which may cause the rail fall arrester to fail, resulting in certain safety hazards.

BRIEF SUMMARY

The present application is intended to address at least one of the technical problems in the prior art. To this end, the present application provides a fall protection locking assembly in which once weightless occurs, a wheel shaft will have a higher rotational speed, and then a transmission member will move towards a drive member under the action of centrifugal force, for driving the drive member to move together, thereby driving the lockup member moves to the lockup position to ensure the safety of use.

The present application further provides a fall protection device.

The present application further provides a fall protection system.

The fall protection locking assembly according to an embodiment of a first aspect of the present application includes:

a fixed main body, configured to be installed to a rail through a first wheel body assembly containing a wheel shaft;

a lockup member installed on the fixed main body and be switched between a lockup position and a free position; and a first trigger mechanism installed to the fixed main body, the first trigger mechanism includes a transmission member and a drive member, the transmission member is configured to be installed to the wheel shaft and rotate with the wheel shaft, and the transmission member is switched with changes in centrifugal force between a first position, in which the transmission member is disengaged from the drive member in the first position, and a second position, in which the transmission member transmits the rotation of the wheel shaft to the drive member so that the drive member rotates to drive the lockup member to move to the lockup position.

For the fall protection locking assembly according to the embodiment of the present application, the transmission member of the first trigger mechanism is installed on the wheel shaft, and the transmission member rotates with the wheel shaft, and thus the transmission member has different rotational speeds and is subjected to different centrifugal forces. When the rotational speed of the wheel shaft exceeds the set rotational speed, the transmission member moves to the second position due to the centrifugal force, the rotation of the wheel shaft is transmitted to the drive member, and the drive member drives the lockup member to move to the lockup position. Therefore, the fall protection locking assembly provides the automatic locking of the fall protection device by monitoring the rotational speed of the wheel shaft. For example, when an operator accidentally falls, the wheel shaft will have a higher rotational speed, and then the transmission member will move towards the drive member under the action of centrifugal force, for driving the drive member to move together, thereby driving the lockup member moves to the lockup position to ensure the safety of use.

According to an embodiment of the present application, the transmission member is installed on an outer surface of the wheel shaft through a first elastic member, the first elastic member is in an original state in the first position, and is stretched in the second position.

According to an embodiment of the present application, the transmission member is trigger blocks, and a plurality of the trigger blocks are fixed to the outer surface of the wheel shaft through a first elastic member; the drive member is a cam, and the trigger blocks are disposed inside the cam, the trigger blocks forms a limiting portion being in limit fit with the inner surface of the cam in the second position; and the lockup member is a locking lever being formed with a first trigger surface of the locking lever matched with the cam.

According to an embodiment of the present application, the fall protection locking assembly further includes:

a second trigger mechanism, installed on the fixed main body and including a swing lever that switches between a reset position, in which the swing lever drives the lockup member to move to the lockup position, and a force-bearing position.

According to an embodiment of the present application, the swing lever includes a trigger end and a free end, wherein the trigger end is connected to the fixed main body through a second elastic member, and the second elastic member is in an original state at the reset position and is compressed at the force-bearing position.

According to an embodiment of the present application, the free end is formed with a connecting hole configured to connect the shock absorption device; the lockup member is a locking lever formed with a second trigger surface of the locking lever matched with the trigger end.

A fall protection device according to an embodiment of a second aspect of the present application includes:

the above-mentioned fall protection locking assembly; and a first wheel body assembly installed on the fixed main body and configured to roll along a rail, the first wheel body assembly including a first wheel set and the first wheel set including the wheel shaft.

Since the fall protection device according to the embodiment of the present application includes the above-mentioned fall protection locking assembly, it has all the technical effects of the above-mentioned fall protection locking assembly, which will not be repeated here.

According to an embodiment of the present application, the wheel shaft is installed to the fixed main body through a sliding mount base, the sliding mount base is connected to the fixed main body through a third elastic member, and the fixed main body is provided with a threaded fastener configured to adjust the third elastic member so that the sliding mount base drives the wheel shaft to move closer to or farther away from a mounting surface of the fixed main body.

According to an embodiment of the present application, the fall protection device further includes:

a second wheel body assembly installed on the fixed main body and configured to roll along an inner support surface of the rail, wherein the second wheel body assembly includes a second wheel set connected to a drive rotary shaft and the drive rotary shaft is connected to a drive rotation member;

a third wheel body assembly installed on the fixed main body and configured to roll along an inner support surface of the rail, the third wheel body assembly includes a third wheel set connected to a driven rotary shaft; and a linkage member disposed between the drive rotary shaft and the driven rotary shaft.

According to an embodiment of the present application, the drive rotation member is connected to the drive rotary shaft through a first pin; the linkage member is a linkage plate, and the drive rotary shaft is connected to the linkage plate through a second pin, the driven rotary shaft is connected to the linkage plate through a third pin, and the fixed main body is provided with a guide limit wheel of the linkage plate and the guide limit wheel is configured to limit the lateral movement of the linkage plate such that the linkage plate moves along the longitudinal direction.

According to an embodiment of the present application, the linkage plate is provided with an L-shaped lockup hole, including a transverse hole section and a longitudinal hole section communicating with the transverse hole section; the fixed main body is provided with a fourth pin that is movable along the transverse hole section, and the linkage plate is locked when the fourth pin is located in the transverse hole section and is movable longitudinally when the fourth pin is located in the longitudinal hole section.

According to an embodiment of the present application, the fall protection device includes a limit mechanism configured to limit the rotation of the drive rotary shaft between two extreme positions, the drive rotary shaft is disposed longitudinally in one of the extreme positions and disposed horizontally at the other one of the extreme positions.

According to an embodiment of the present application, the linkage member is a linkage plate, and the drive rotary shaft is connected to the linkage plate through a second pin; the fall protection device further includes a cover of the linkage plate; the limit mechanism includes the second pin and a limit hole formed on the cover, the second pin rotates in the limit hole, and the limit hole is configured that the second pin is in limit fit with the inner wall of the limit hole when the drive rotary shaft rotates to the extreme positions and the rotational angle of the drive rotary shaft is not greater than ninety degrees.

According to an embodiment of the present application, the second wheel body assembly further includes a slider, the slider is fixed to the drive rotary shaft, and the slider is formed with a mounting groove for the second wheel set; the limit mechanism includes the slider and a protrusion formed on the fixed main body; the slider is in limit fit with the protrusion when the drive rotary shaft rotates to the extreme positions.

According to an embodiment of the present application, a first positioning groove is disposed on the fixed main body, a sliding pin is disposed in the first positioning groove, and a second positioning groove and a third positioning groove are disposed on the drive rotary shaft; and the first positioning groove, the second positioning groove, and the third positioning groove are configured such that when the fall protection device is reversely installed on the rail, and the drive rotary shaft rotates to one of the extreme positions, the first positioning groove corresponds to the second positioning groove, such that the sliding pin partly enters the second positioning groove; and when the fall protection device is reversely installed on the rail, and the drive rotary shaft rotates to the other one of the extreme positions, the first positioning groove corresponds to the third positioning groove, so that the sliding pin partially enters the third positioning groove.

A fall protection system according to an embodiment of a third aspect of the present application includes a rail, and further includes the above-mentioned fall protection device installed on the rail.

Since the fall protection system according to the embodiment of the present application includes the above-mentioned fall protection device, it has all the technical effects of the above-mentioned fall protection device, which will not be repeated here.

The additional aspects and advantages of the present application will be partially given in the following description, and some thereof will become obvious from the following description, or be understood through the practice of the present application.

BRIEF DESCRIPTION OF THE DRAWINGS

In order to more clearly illustrate the technical solutions disclosed in the embodiments of the present application or the prior art, drawings needed in the descriptions of the embodiments or the prior art will be briefly described below. Obviously, the drawings in the following description only show some of the embodiments of the present application, and other drawings can be obtained according to these drawings without any creative effort for those skilled in the art.

Figure 1:
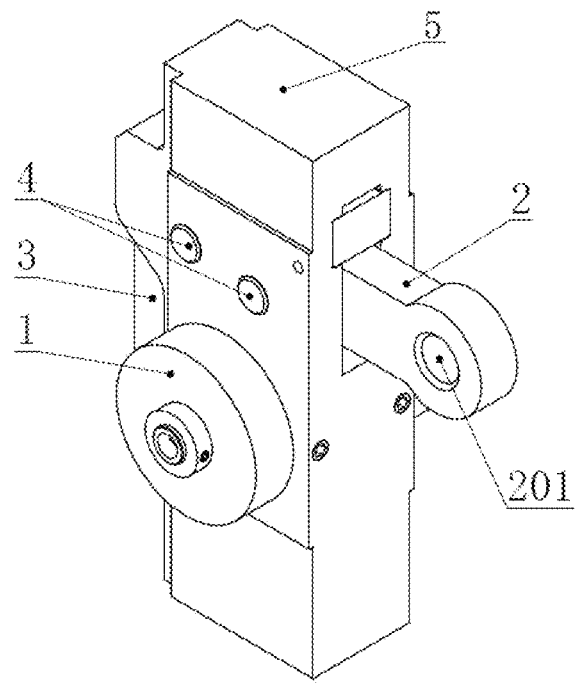
FIG. 1 is a schematic structural diagram of a fall protection locking assembly according to an embodiment of the present application.

REFERENCE NUMERALS 1 first trigger mechanism; 10 first wheel body assembly; 101 rotation wheel; 102 sliding mount base; 103 third spring; 104 support plate; 105 cam; 1051 trigger surface of the cam; 106 wheel shaft 107 first pin shaft; 108 trigger block; 109 fixed base; 110 second pin shaft; 111 first spring; 2 second trigger mechanism; 20 swing lever; 201 connecting hole; 202 action surface; 203, trigger surface of the swing lever; 3 locking lever; 301 second trigger surface of the locking lever; 302 first trigger surface of the locking lever; 303 positioning surface; 304 support surface of the locking lever; 4 mandrel; 5 fixed main body; 501 first limit surface; 502 second limit surface; 503 first mounting hole; 504 second mounting hole; 505 fifth limit surface; 6 fourth spring; 7 second spring; 8 adjustment screw;

01 second wheel body assembly; 0101 slider; 01011 lockup support slider; 01012 running support slider; 0102 drive rotary shaft; 01021 second positioning groove; 01022 third positioning groove; 01023 first reset hole; 0103 drive rotation member; 0104 first pin; 0105 second pin; 0106 fifth spring; 0107 roller; 0108 mounting shaft; 0109 positioning washer; 02 third wheel body assembly; 0201 driven rotary shaft; 02011 second reset hole; 0202 third pin; 03 linkage plate; 0301 driven hole; 0302 lockup hole; 0303 drive hole; 0304 guide surface 04 unlocking assembly; 0401 sliding shaft; 0402 sixth spring; 0403 fourth pin; 05 cover; 0501 third limit surface; 0502 fourth limit surface; 07 fixed screw; 08 guide limit wheel; 09 sliding pin; 0601 first positioning groove; 0602 sliding hole; 0603 driven positioning hole; 0604 drive positioning hole;

006 rail; 009 carabiner; 0011 shock absorption device; 00601 slider passage; 00602 running limit surface; 00603 outer support surface; 00604 inner support surface; 00605 rail support surface.

DETAILED DESCRIPTION

The specific embodiments of the present application are further described in detail below in conjunction with the drawings and embodiments. The following embodiments are intended to illustrate the present application, but are not intended to limit the scope of the present application.

In the description of the embodiments of the present application, the terms "first", "second", "third", and the like are used for descriptive purposes only and are not to be construed as indicating or implying relative importance.

In the description of the embodiments of the present application, it should be noted that unless explicitly specified and defined otherwise, the terms "connected with," and "connected" shall be understood broadly, for example, it may be either fixedly connected or detachably connected, or may be integrally connected; it may be mechanically connected, or electrically connected; it may be directly connected, or indirectly connected through an intermediate medium. The specific meanings of the terms above in the embodiments of the present application can be understood by a person skilled in the art in accordance with specific conditions.

In the embodiments of the present application, unless otherwise clearly specified and defined, the first feature being located "on" or "under" the second feature means that the first feature is in direct contact with the second feature or the first feature is in contact with the second feature by an intervening media. Also, the first feature being located "on", "above" and "on top of" the second feature may mean that the first feature is directly on or above the second feature, or it simply means that the level of the first feature is higher than the second feature. The first feature being located "under", "below" and "on bottom of" the second feature may mean that the first feature is directly under or below the second feature, or it simply means that the level of the first feature is lower than the second feature.

In the description of this specification, descriptions with reference to the terms "one embodiment", "some embodiments", "examples", "specific examples", or "some examples" etc. mean that specific features, structure, materials or characteristics described in conjunction with the embodiment or example are included in at least one embodiment or example of the embodiments of the present application. In this specification, the schematic expressions of the above terms do not necessarily refer to the same embodiment or example. Also, the described specific features, structures, materials or characteristics can be combined in any one or more embodiments or examples in a suitable manner. In addition, those skilled in the art may integrate and combine the different embodiments or examples and the features of the different embodiments or examples described in this specification without contradicting each other.

Figure 17:
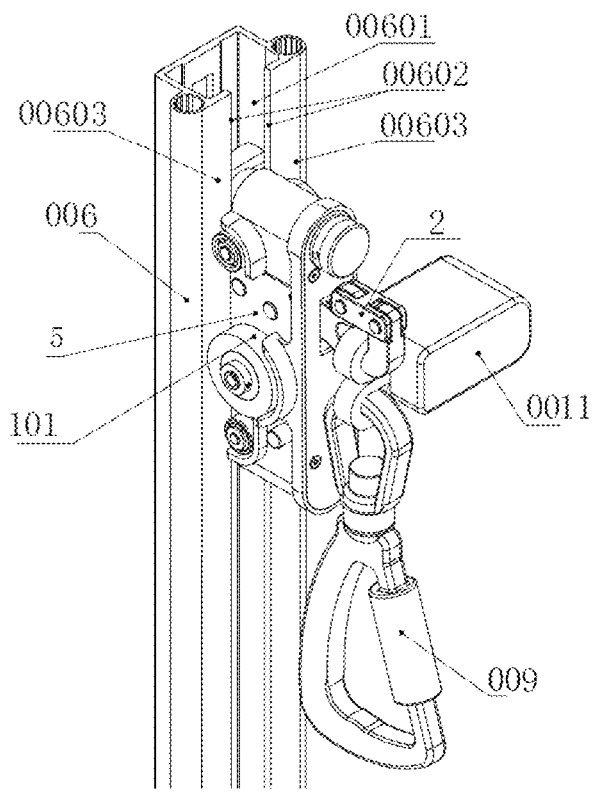
FIG. 17 is a schematic diagram showing an assembly of a fall protection system according to an embodiment of the present application.
Figure 18:
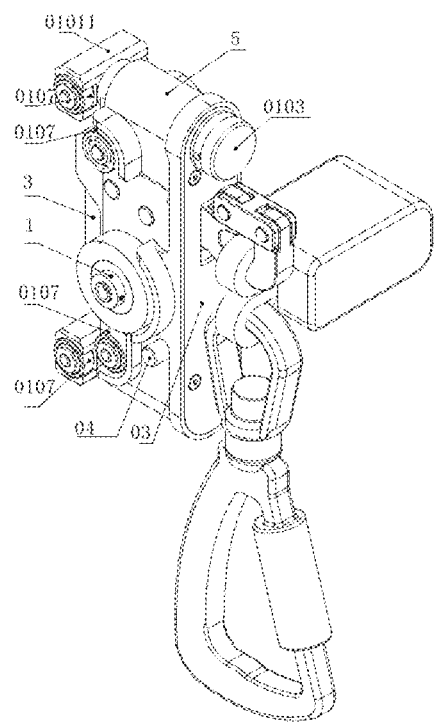
FIG. 18 is a schematic structural diagram of a fall protection system in one form in which a rail is removed according to an embodiment of the present application.
Figure 19:
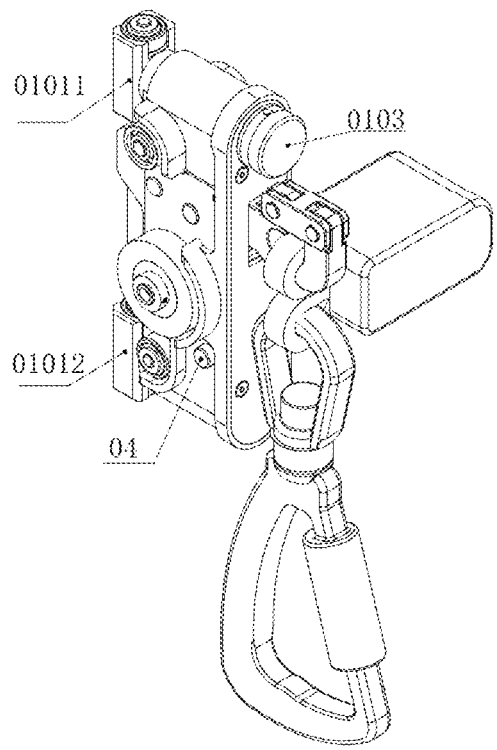
FIG. 19 is a schematic structural diagram of a fall protection system in another form in which a rail is removed according to an embodiment of the present application.
Figure 20:
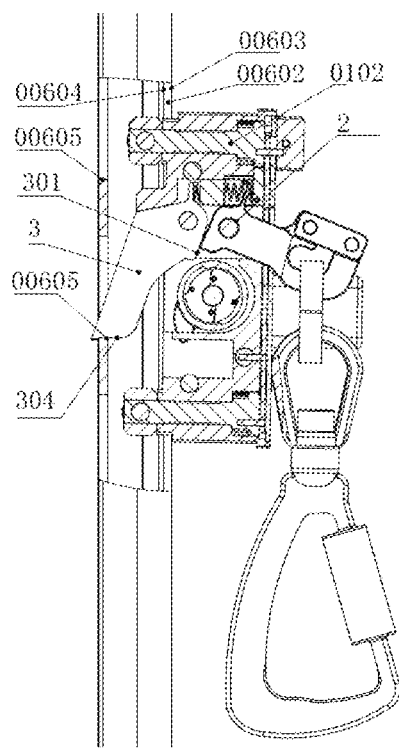
FIG. 20 is a schematic partial cross-sectional view of a fall protection system when being triggered by a second trigger mechanism according to an embodiment of the present application.
Figure 21:
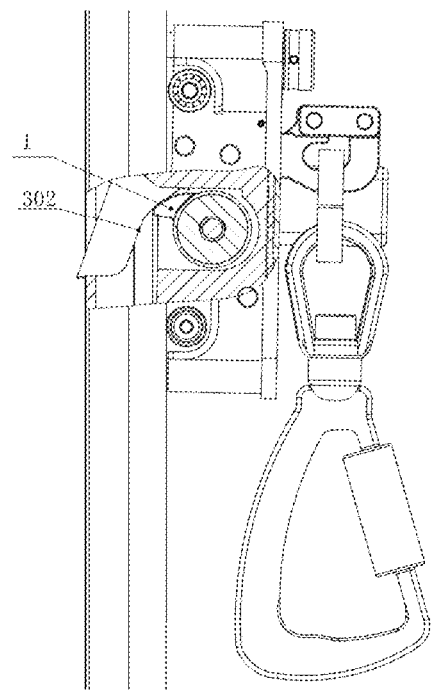
FIG. 21 is a schematic partial cross-sectional view of a fall protection system when being triggered by a first trigger mechanism according to an embodiment of the present application.
Figure 22:
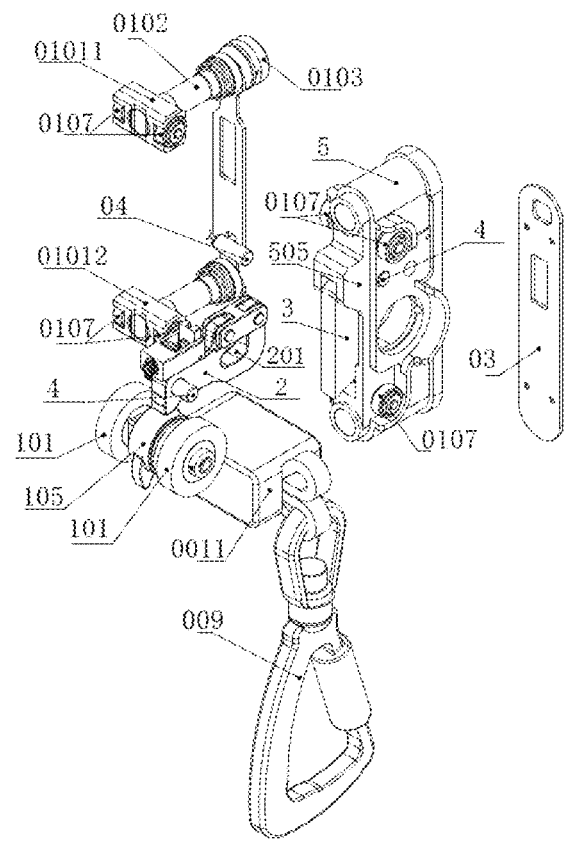
FIG. 22 is a schematic exploded view of a fall protection system in which a rail is removed according to an embodiment of the present application.

Referring to FIGS. 1 to 6, the fall protection locking assembly according to an embodiment of the present application includes a fixed main body 5, a lockup member and a first trigger mechanism 1. The fixed main body 5 is configured to be installed to a rail 006 (the structure of the rail 006 is shown in FIGS. 17, 20 and 21) through a first wheel body assembly 10 containing a wheel shaft 106; the lockup member is configured to be installed on the fixed main body 5 and be switched between a lockup position and a free position; and the first trigger mechanism 1 is configured to be installed to the fixed main body 5, the first trigger mechanism 1 includes a transmission member and a drive member, the transmission member is configured to be installed to the wheel shaft 106 and rotate with the wheel shaft 106, and the transmission member is switched with changes in centrifugal force (the transmission member rotates with the wheel shaft 106 and is therefore subjected to centrifugal force) between a first position, in which the transmission member is disengaged from the drive member in the first position, and a second position, in which the transmission member transmits the rotation of the wheel shaft 106 to the drive member so that the drive member rotates to drive the lockup member to move to the lockup position.

For the fall protection locking assembly according to the embodiment of the present application, the transmission member of the first trigger mechanism 1 is installed on the wheel shaft 106, and the transmission member rotates with the wheel shaft 106, and the transmission member has different rotational speeds and is subjected to different centrifugal forces. When the rotational speed of the wheel shaft 106 exceeds the set rotational speed, the transmission member moves to the second position due to the centrifugal force, and the rotation of the wheel shaft 106 is transmitted to the drive member, and the drive member drives the lockup member to move to the lockup position. Therefore, the fall protection locking assembly provides the automatic locking of the fall protection device by monitoring the rotational speed of the wheel shaft 106. For example, when an operator accidentally falls, a wheel shaft 106 will have a higher rotational speed, and then a transmission member will move towards a drive member under the action of centrifugal force, the wheel shaft 106 drives the drive member to move together, thereby driving the lockup member moves to the lockup position to ensure the safety of use.

In an embodiment, the situation where the "transmission member is installed to the wheel shaft 106" refers to the situation in which the transmission member may rotate with the wheel shaft 106. For example, an opening may be provided on the wheel shaft 106, and then the transmission member may be at least partially disposed in the opening; for another example, the transmission member may be installed on the outer surface of the wheel shaft 106.

In addition, the fixed main body 5 is generally installed on the outer support surface 00603 of the rail through the first wheel body assembly 10, but it is not excluded that the first wheel body assembly 10 of the fixed main body is installed on other positions of the rail.

According to an embodiment of the present application, the transmission member is installed on the wheel shaft 106 through a first elastic member, the first elastic member is in an original state in the first position, and is stretched in the second position.

Figure 2:
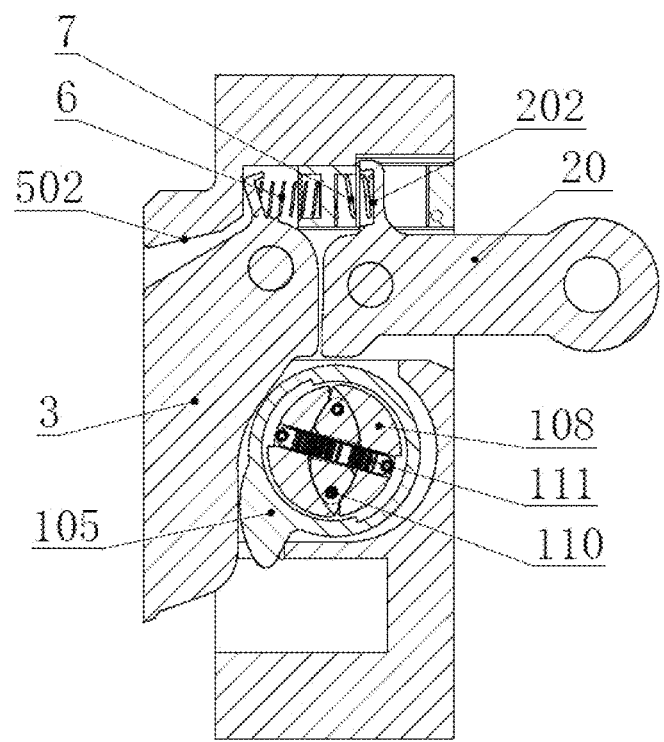
FIG. 2 is a schematic cross-sectional view of a fall protection locking assembly according to an embodiment of the present application.
Figure 3:
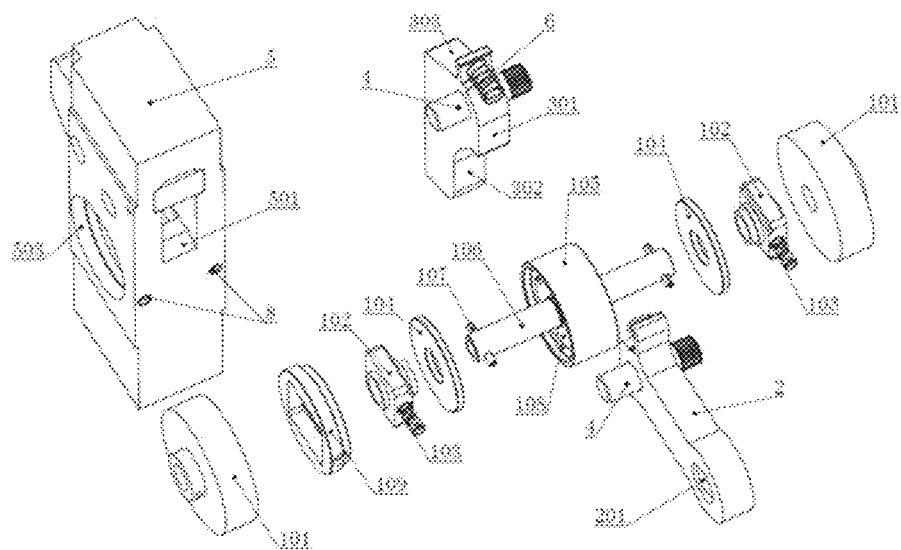
FIG. 3 is a schematic exploded view of a fall protection locking assembly according to an embodiment of the present application.
Figure 5:
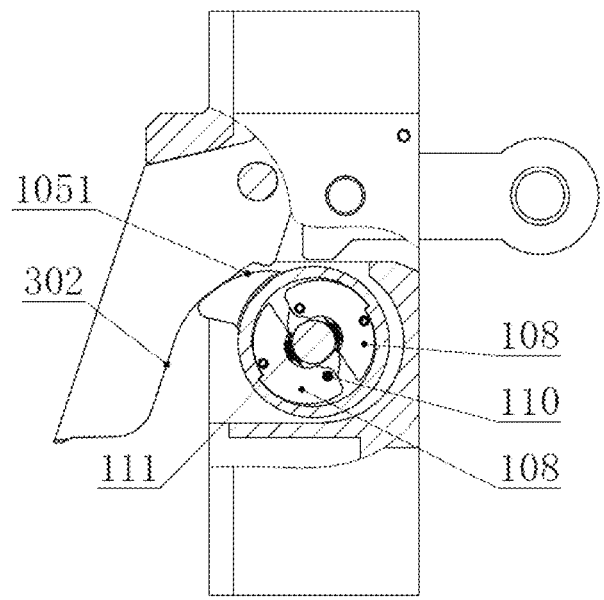
FIG. 5 is a schematic diagram showing the working state when a swing lever triggers a locking lever in a fall protection locking assembly according to an embodiment of the present application.

Referring to FIGS. 1, 2 and 3, in the fall protection locking assembly of the present embodiment, the transmission member is trigger blocks 108, and a plurality of trigger blocks 108 are connected by a first elastic member (first spring 111). The first elastic member is in the original state in the first position (see FIG. 2), and is stretched in the second position (see FIG. 5). The drive member is a cam 105, and the trigger blocks 108 are disposed inside the cam 105 and the trigger blocks 108 forms a limiting portion. Referring to FIG. 5, the limiting portion is in limit fit with the inner surface of the cam 105 in the second position; and the lockup member is a locking lever 3 being formed with a first trigger surface of the locking lever 302, the cam 105 is formed with a trigger surface of the cam 1051 such that the cam 105 acts on the first trigger surface of the locking lever 302 through the trigger surface of the cam 1051 to drive the locking lever 3 to rotate. Referring to FIGS. 2 and 3, the locking lever 3 is formed with a positioning surface 303, and when the locking lever 3 moves to the lockup position, the positioning surface 303 of the locking lever 3 is matched with the second limit surface 502 on the fixed main body 5 (the first limit surface 501 will be mentioned later when the second trigger mechanism 2 is described).

In an embodiment, the number of trigger blocks 108 is two, and the first elastic member between the two trigger blocks 108 is the first spring 111. Under normal circumstances, the first spring 111 is in the original state. At this time, one end of the first spring 111 is connected to one of the trigger blocks 108, and the other end of the first spring 111 is connected to the other trigger block 108. The two trigger blocks 108 are installed on the outer surface of the wheel shaft 106. When the rotational speed of the wheel shaft 106 exceeds the set rotational speed, the two trigger blocks 108 tend to move away from the axis of the wheel shaft 106 due to centrifugal force, such that the first spring 111 is stretched. When the trigger blocks 108 move to the second position, a limit fit is formed between the trigger blocks 108 and the inner surface of the cam 105, and the wheel shaft 106 transmits the movement to the cam 105 through the trigger blocks 108.

Figure 7:
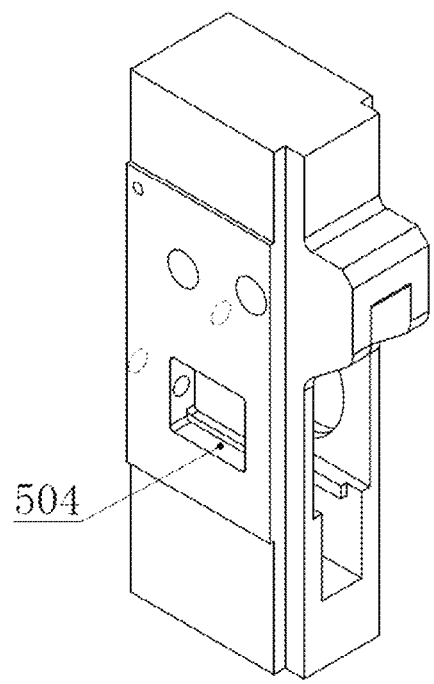
FIG. 7 is a schematic structural diagram of a fixed main body in a fall protection locking assembly according to an embodiment of the present application.

In an embodiment, referring to FIGS. 2, 3 and 7, the rotation wheel 101 of the first wheel set is installed on the wheel shaft 106 through the first pin 107, and the trigger blocks 108 are installed on the wheel shaft 106 through the second pin 110. The cam 105 is installed on the wheel shaft 106 through the support plate 104 and the sliding mount base 102. The sliding mount base 102 at one end of the wheel shaft 106 is installed on the fixed base 109 and then installed on the first mounting hole 503 of the fixed main body 5, and the sliding mount base 102 at the other end of the wheel shaft 106 is installed on the second mounting hole 504 of the fixed main body 5.

Of course, the specific structures of the transmission member, the drive member and the lockup member are not limited by the examples here. For example, the transmission member may also be a transmission shaft installed on the wheel shaft 106. When the rotational speed of the wheel shaft 106 is greater than the set rotational speed, the transmission shaft moves toward the drive member under the action of centrifugal force, and the transmission shaft is in limit fit with the drive member to achieve the purpose of transmitting the rotation of the wheel shaft 106 to the drive member. For another example, when the transmission member is the trigger blocks 108, the shape and the number of the trigger blocks 108 may not be limited by the drawings, for example, the number of the trigger block 108 may also be one, three or any number. In addition, the drive member is not necessarily the cam 105, as long as it may follow the wheel shaft 106 to rotate and drive the lockup member to move to the lockup position when the transmission member is in the second position. Similarly, the lockup member is not necessarily in the form of the locking lever 3, as long as it may be switched between the lockup position and the free position, and may be configured to lock the fall protection device to the rail 006 when it moves to the lockup position.

According to an embodiment of the present application, referring to FIGS. 1 to 6, the fall protection locking assembly further includes a second trigger mechanism 2. The second trigger mechanism 2 is installed on the fixed main body and includes a swing lever 20 that switches between a reset position, in which the swing lever 20 drives the lockup member to move to the lockup position, and a force-bearing position.

Specifically, under normal conditions, the swing lever 20 is directly or indirectly hung on the operator under the action of the gravity of the fall protection locking assembly, and the swing lever 20 does not exert any force on the lockup member at this time. In the case of weightlessness, the force of gravity acting on the swing lever 20 disappears. At this time, the swing lever 20 will exert a force on the lockup member, and the swing lever 20 and the first limit surface 501 of the fixed main body 5 will form a limit fit. The trigger surface of the swing lever 203 exerts an action on the second trigger surface of the locking lever 301, so that the lockup member moves to the lockup position.

Therefore, with the above-mentioned first trigger mechanism 1 and the second trigger mechanism 2 of the fall protection locking assembly, the two sets of trigger mechanisms act independently and do not interfere with each other, which ensures the safety and reliability of the fall protection device.

Figure 4:
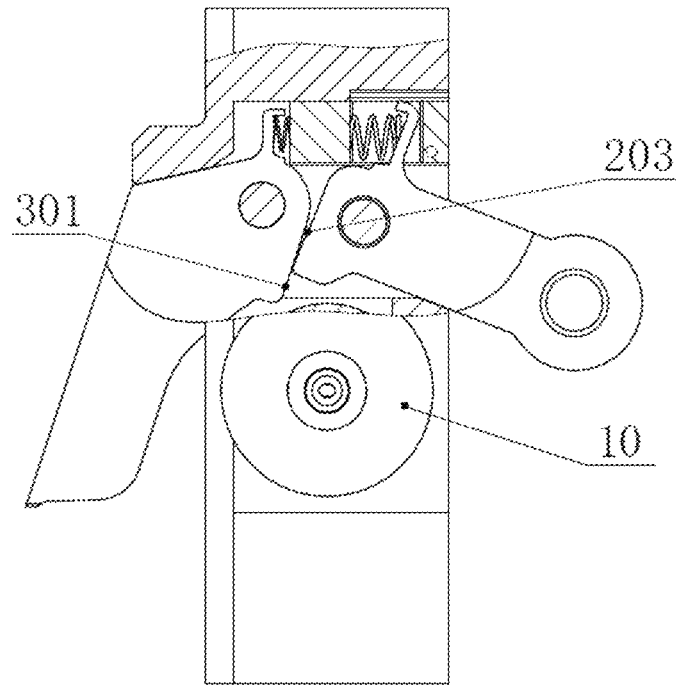
FIG. 4 is a schematic diagram showing the working state when a swing lever triggers a locking lever in a fall protection locking assembly according to an embodiment of the present application.

According to an embodiment of the present application, referring to FIGS. 2 and 4, the swing lever 20 includes a trigger end (left end) and a free end (right end), wherein the trigger end is connected to the fixed main body 5 through a second elastic member, and the second elastic member is in the original state at the reset position and is compressed at the force-bearing position.

According to an embodiment of the present application, the free end is formed with a connecting hole 201 configured to connect the shock absorption device 0011; the lockup member is a locking lever 3 formed with a second trigger surface of the locking lever 301 matched with the trigger end.

In addition, an action surface 202 is formed at the trigger end of the swing lever 20, and one end of the second elastic member is connected to the fixed main body 5, and the other end of the second elastic member is connected to the action surface 202. Under normal circumstances, the swing lever 20 is configured to lift upward the free end of the swing lever 20 by the gravity of the fall protection locking assembly. At this time, the action surface 202 compresses the second elastic member, and the trigger end and the locking lever 3 are independent of each other. When an accidental fall occurs, the swing lever 20 is no longer subjected to the gravity of the fall protection locking assembly at this time, and then the second elastic member in the compressed state at this time will exert a force on the swing lever 20 to make the swing lever 20 rotate clockwise and drive the locking lever 3 to rotate clockwise to the lockup position.

In an embodiment, the second elastic member is a second spring 7. Of course, all the elastic members including the second elastic member in the present application are not limited to the structure of springs, and other structures with deformation and reset functions can also be adopted.

Referring to FIGS. 2 to 4, the locking lever 3 is connected to the fixed main body 5 through a fourth elastic member, and the fourth elastic member may be, but is not limited to, a fourth spring 6. Under normal circumstances, the locking lever 3 is connected to the fixed main body 5 through the fourth spring 6. When the fourth spring 6 is in the original state, the locking lever 3 is in a free position here with respect to the lockup position. That is, when the locking lever 3 is in the free position, the movement of the fall protection device will not be affected. In the case that the locking lever 3 is driven by the aforementioned cam 105 or the swing lever 20, the locking lever 3 moves to the lockup position, and then the locking lever 3 compresses the fourth spring 6 at this time.

Referring to FIGS. 1, 2 and 3, the locking lever 3 and the swing lever 20 are both installed on the fixed main body 5 through a mandrel 4, and the locking lever 3 and the swing lever 20 each rotate with the mandrel 4 as the central axis.

According to an embodiment of the present application, a fall protection device is provided including the above-mentioned fall protection locking assembly and the first wheel body assembly 10. The first wheel body assembly 10 is installed on the fixed main body 5 for rolling along the outer support surface 00603 of the rail 006 (the possibility of the first wheel body assembly 10 rolling along other positions of the rail 006 is not excluded), the first wheel body assembly 10 includes a first wheel set including the above-mentioned wheel shaft 106 and a rotation wheel 101 installed on the wheel shaft 106.

The fall protection device of the embodiment of the present application has the above-mentioned fall protection locking assembly, so that the safety of a constructor may be ensured in the event of a fall.

Figure 6:
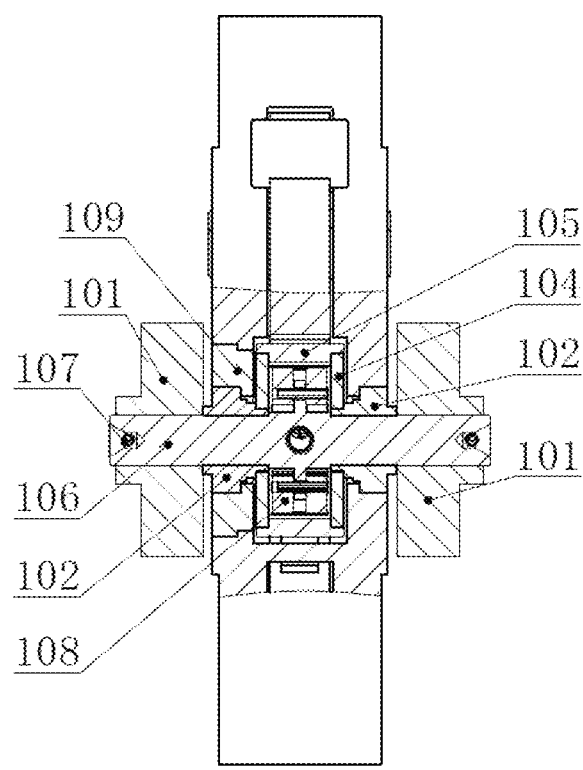
FIG. 6 is a schematic structural diagram of a fall protection locking assembly showing the cross-sectional effect of a first trigger mechanism according to an embodiment of the present application.

In an embodiment, referring to FIGS. 3 and 6, the wheel shaft 106 is installed to the fixed main body 5 through a sliding mount base 102, the sliding mount base 102 is connected to the fixed main body 5 through a third elastic member, and the fixed main body 5 is provided with a threaded fastener configured to adjust the state of the third elastic member. When the specific threaded fastener rotates, the state of the third elastic member changes, through which the sliding mount base 102 is driven to slide. The sliding mount base 102 drives the wheel shaft 106 to move closer to or farther away from a mounting surface of the fixed main body 5 when it slides. The mounting surface of the fixed main body 5 refers to the surface of the fixed main body 5 facing the outer support surface 00603, that is, the left side surface of the fixed main body 5 in FIGS. 4 and 5. In an embodiment, the wheel shaft 106 is close to the mounting surface of the fixed main body 5, so that when the fixed main body 5 is installed on the rail 006, the rotation wheel 101 on the wheel shaft 106 gets closer to the outer support surface 00603 of the rail 006; the wheel shaft 106 is far away from the mounting surface of the fixed main body 5, which may ensure that the rotation wheel 101 on the wheel shaft 106 and the outer support surface 00603 of the rail 006 do not interfere with each other when the fixed main body 5 is installed on the rail 006.

Therefore, by adjusting the threaded fastener, it is possible to ensure a better fit between the rotation wheel 101 on the wheel shaft 106 and the outer support surface 00603 of the rail 006, and to ensure that the rotation wheel 101 may roll along the outer support surface 00603.

According to an embodiment of the present application, the threaded fastener is an adjustment screw 8, and the third elastic member is a third spring 103 with an adjustment function. The adjustment screw 8 is installed on the fixed main body 5, and the third spring 103 is compressed by the adjustment screw 8 to adjust the position of the wheel shaft 106, so that the rotation wheel 101 of the first wheel set is in contact with the rail 006 in real time, and the wheel shaft 106 rotates when the first wheel set rotates to drive the trigger block 108 to rotate. Once the centrifugal force of the trigger block 108 exceeds a set value, the trigger block 108 moves toward the cam 105 and forms a limit fit with the inner surface of the cam 105, so that the wheel shaft 106 drives the cam 105 to rotate through the trigger block 108, and the cam 105 rotates to drive the locking lever 3 to move to the lockup position. Therefore, it is ensured that the rotation wheel 101 of the first wheel set is in contact with the rail 006, and the purpose of monitoring the running speed of the fall protection device may be achieved. When the falling speed of the fall protection device exceeds a set value, the cam 105 triggers the locking lever 3 to move to the lockup position, and then the fall protection device is locked onto the rail 006.

According to an embodiment of the present application, referring to FIGS. 8 to 16, the fall protection device further includes a second wheel body assembly 01 and a third wheel body assembly 02. The second wheel body assembly 01 is installed on the fixed main body 5 for rolling along an inner support surface 00604 of the rail 006, the second wheel body assembly 01 includes a second wheel set connected to a drive rotary shaft 0102 and the drive rotary shaft 0102 is connected to a drive rotation member 0103. The third wheel body assembly 02 is installed on the fixed main body 5 for rolling along an inner support surface 00604 of the rail 006, the third wheel body assembly 02 includes a third wheel set connected to a driven rotary shaft 0201. A linkage member is disposed between the drive rotary shaft 0102 and the driven rotary shaft 0201.

Therefore, in the fall protection device of the embodiment of the present application, when the drive rotation member 0103 is rotated, the drive rotation member 0103 will drive the drive rotary shaft 0102 to rotate, thereby driving the second wheel set to rotate as a whole. Once the drive rotary shaft 0102 rotates, the driven rotary shaft 0201 will be driven to rotate through the linkage, and then the third wheel set is driven to rotate. Therefore, during the installation process of the fall protection device, it is only necessary to rotate the drive rotation member 0103 to change the fall protection device from the state shown in FIG. 8 to the state shown in FIG. 10, so as to facilitate the installation of the fall protection device. Similarly, when the fall protection device is disassembled, only the drive rotation member 0103 needs to be rotated.

It should be noted that although only one third wheel body assembly 02 as well as one driven rotary shaft 0201 is shown in the drawings, it is obvious that the number of the third wheel body assembly 02 is not limited by this example, and thus the number of the driven rotation axis 0201 is not limited.

Referring to FIGS. 8 to 16, the drive rotation member 0103 is connected to the drive rotary shaft 0102 through a first pin 0104; the linkage member is a linkage plate 03, and the drive rotary shaft 0102 is connected to the linkage plate 03 through a second pin 0105, the driven rotary shaft 0201 is connected to the linkage plate 03 through a third pin 0202, and the fixed main body 5 is provided with a guide limit wheel 08 of the linkage plate 03 configured to limit the lateral movement of the linkage plate 03 such that the linkage plate 03 moves along the longitudinal direction.

In an embodiment, the longitudinal direction in "guide limit wheel 08 configured to limit the lateral movement of the linkage plate 03 such that the linkage plate 03 moves along the longitudinal direction" refers to the extending direction of the rail 006, and the lateral direction is the width direction of the rail 006, that is, the direction perpendicular to the longitudinal direction. When the drive rotation member 0103 drives the drive rotary shaft 0102 to rotate, the second pin 0105 also rotates. Since the linkage plate 03 only moves in the longitudinal direction, the second pin 0105 drives the linkage plate 03 to move longitudinally, it must move laterally relative to the linkage plate 03. It can be seen that a drive hole 0303 extending in the transverse direction is formed on the linkage plate 03, one end of the second pin 0105 is installed on the drive rotary shaft 0102, and the other end of the second pin 0105 is located in the drive hole 0303 and connected to the linkage plate 03 through the drive hole 0303. In the same way, a driven hole 0301 extending transversely is formed on the linkage plate 03, and the third pin 0202 is connected to the linkage plate 03 through the driven hole 0301.

As shown in FIGS. 8, 10, 13, 14 and 16, the number of guide limit wheels 08 is four, and the guide limit wheels 08 are installed on the fixed main body 5 by fixed screws 07, the linkage plate 03 is formed with a guide surface 0304, and it is ensured that the linkage plate 03 moves along the longitudinal direction through the matching between the guide limit wheel 08 and the guide surface 0304. Of course, the guide limit wheels 08 are not necessary structures, and in the case that the guide limit wheels 08 are provided, the number and distribution position of the guide limit wheels 08 may also be adjusted as required.

Figure 8:
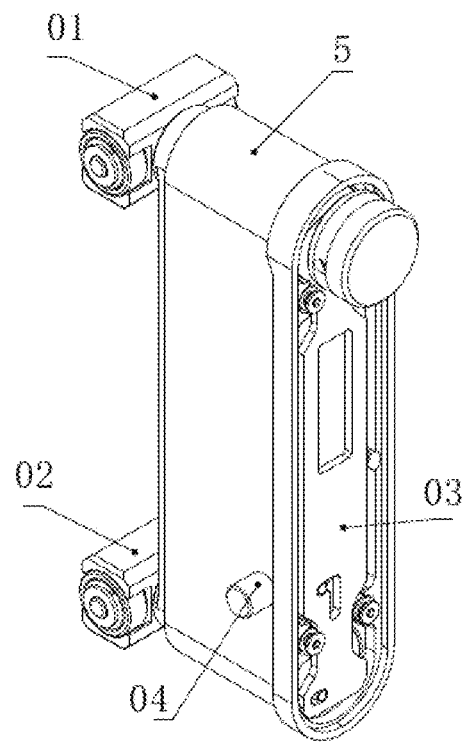
FIG. 8 is a schematic partial structural diagram of a fall protection device in one form according to an embodiment of the present application.
Figure 10:
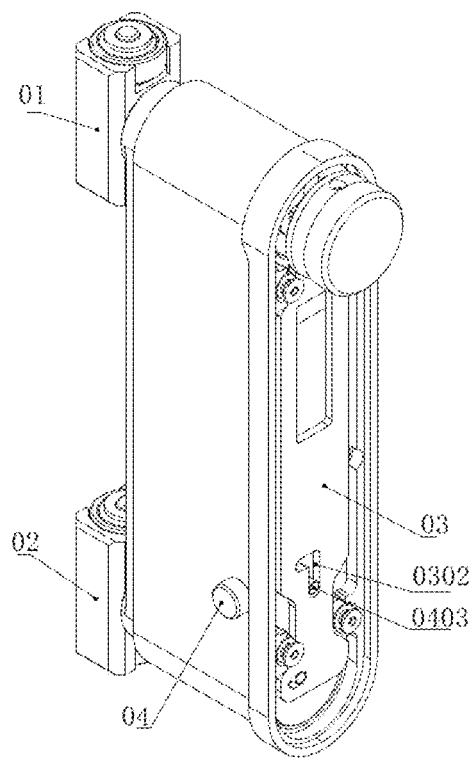
FIG. 10 is a schematic partial structural diagram of a fall protection device in another form according to an embodiment of the present application.
Figure 11:
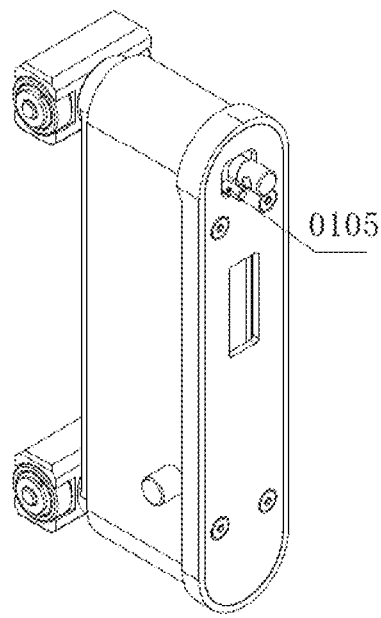
FIG. 11 is a schematic partial structural diagram of a fall protection device in one form when a cover is installed according to an embodiment of the present application.
Figure 12:
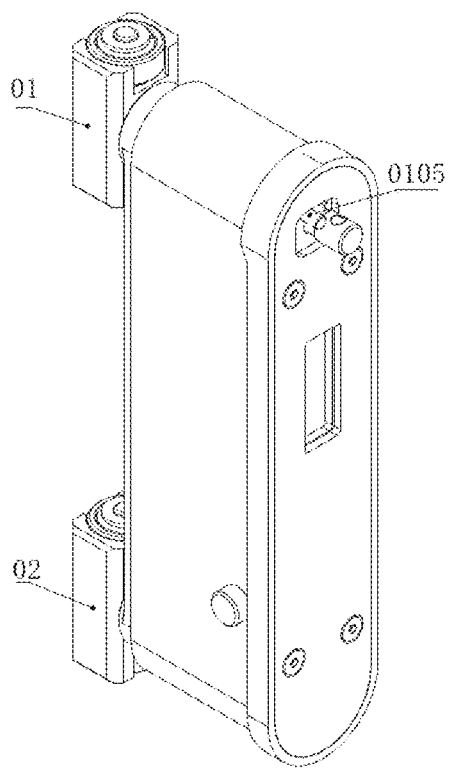
FIG. 12 is a schematic partial structural diagram of a fall protection device in another form when a cover is installed according to an embodiment of the present application.
Figure 13:
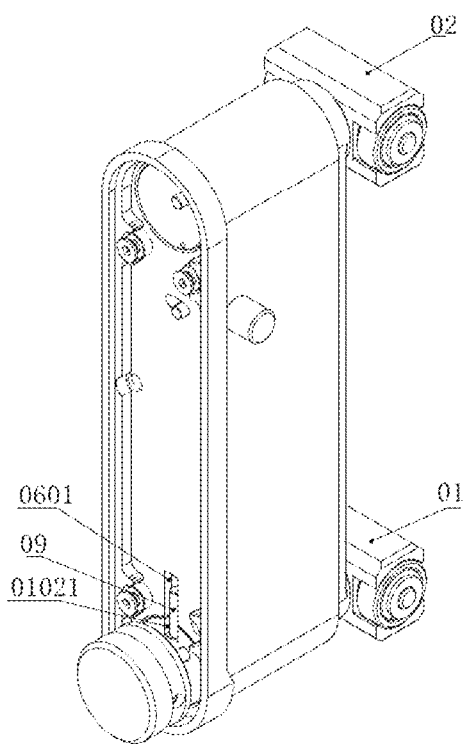
FIG. 13 is a schematic partial structural diagram of a fall protection device in one form when being reversely installed according to an embodiment of the present application.
Figure 14:
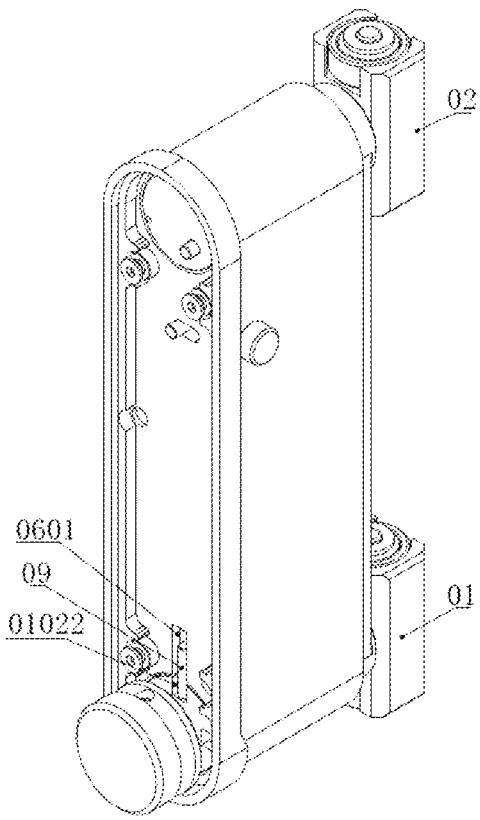
FIG. 14 is a schematic partial structural diagram of a fall protection device in another form when it is reversely installed according to an embodiment of the present application.
Figure 16:
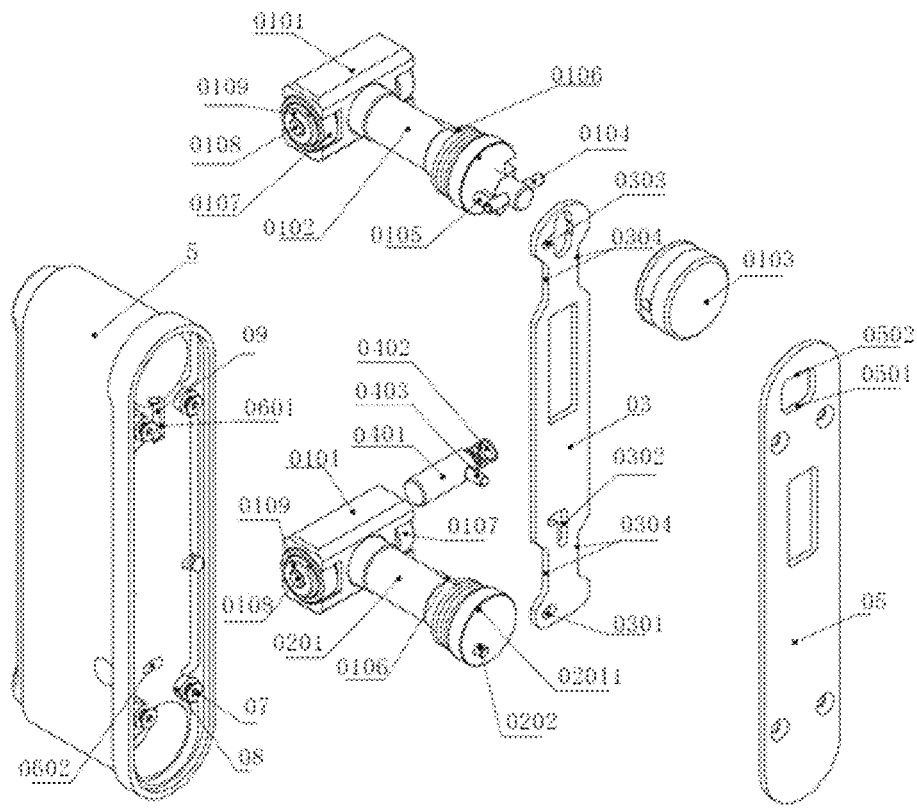
FIG. 16 is a schematic partial exploded structural view of a fall protection device according to an embodiment of the present application.

Referring to FIGS. 8, 10 and 16, an L-shaped lockup hole 0302 is provided on the linkage plate 03, and includes a transverse hole section and a longitudinal hole section communicating with the transverse hole section; the fixed main body 5 is provided with a fourth pin 0403 movable along the transverse hole section, and the linkage plate 03 is locked when the fourth pin 0403 is located in the transverse hole section and is movable longitudinally when the fourth pin 0403 is located in the longitudinal hole section.

According to an embodiment of the present application, the fall protection device includes an unlocking assembly 04. The unlocking assembly 04 includes the above-mentioned fourth pin 0403, and further includes a sliding shaft 0401 and a sixth spring 0402 passing through the sliding hole 0602 on the fixed main body 5 to be connected to a sliding shaft 0401 through the fourth pin 0403. By pressing the sliding shaft 0401, the sixth spring 0402 may be compressed, so that the fourth pin 0403 moves to the longitudinal hole section of the lockup hole 0302. At this time, the rotating of drive rotation member 0103 may drive the linkage plate 03 to be lifted. When the fourth pin 0403 is located in the transverse hole section of the lockup hole 0302, the linkage plate 03 cannot be lifted, and thus the drive rotation member 0103 cannot be rotated.

The fall protection device according to an embodiment of the present application includes a limit mechanism configured to limit the rotation of the drive rotary shaft 0102 between two extreme positions, the drive rotary shaft 0102 is disposed longitudinally in one of the extreme positions and disposed horizontally at the other one of the extreme positions. Here, the "longitudinal" and "lateral" also refer to the extending direction of the rail 006 and the width direction of the rail 006, respectively. When the drive rotary shaft 0102 is disposed longitudinally, the state of the fall protection device is shown in FIG. 10, which may facilitate the disassembly and assembly of the fall protection device at this time. When the drive rotary shaft 0102 is disposed horizontally, the state of the fall protection device is shown in FIG. 8. At this time, the fall protection device may be fixed on the rail 006 to prevent the fall protection device from being separated from the rail 006.

Referring to FIG. 16, the fall protection device according to the embodiment of the present application further includes a cover 05 of the linkage plate 03, and the cover 05 is provided with a limit hole in which the second pin 0105 rotates. The limit hole and the second pin 0105 constitute above-mentioned limit mechanism.

In an embodiment, the limit hole is configured that the second pin 0105 is in limit fit with the inner wall of the limit hole when the drive rotary shaft 0102 rotates to the extreme positions, and the rotational angle of the drive rotary shaft 0102 is not greater than ninety degrees.

Of course, in addition to the structural form of the limit hole and the second pin 0105, the limit mechanism may also adopt other structural forms, as long as the limiting requirement for the drive rotary shaft 0102 is satisfied. For example, the second wheel body assembly 01 further includes a slider 0101, the slider 0101 is fixed to the drive rotary shaft 0102, and the slider 0101 is formed with a mounting groove for the second wheel set; the limit mechanism includes the slider 0101 and a protrusion formed on the fixed main body 5; the slider 0101 is in limit fit with the protrusion of the fixed main body 5 when the drive rotary shaft 0102 rotates to the extreme positions.

In FIGS. 11 to 14, when the fall protection device is switched between the two states, the rotational angle of the drive rotary shaft 0102 is exactly ninety degrees. If the rotational angle of the drive rotary shaft 0102 is less than ninety degrees, the disassembly and assembly requirements of the fall protection device may also be satisfied, the rotational angle of the drive rotary shaft 0102 may also be limited to a smaller value. Alternatively, it is also possible to limit the rotational angle of the drive rotary shaft 0102 between the two extreme positions to be greater than ninety degrees.

In FIG. 16, the limit hole includes a third limit surface 0501 and a fourth limit surface 0502. When the drive rotation member 0103 is rotated, the drive rotary shaft 0102 drives the second pin 0105 to rotate in the limit hole. When the drive rotary shaft 0102 rotates to the first extreme position, the second pin 0105 is in contact with the third limit surface 0501 while when the drive rotary shaft 0102 rotates to the second extreme position, the second pin 0105 is in contact with the fourth limit surface 0502. Through the matching between the second pin 0105 and the third limit surface 0501 as well as the fourth limit surface 0502, it is ensured that the fall protection device may only be switched between the two forms shown in FIGS. 11 and 12.

Referring to FIGS. 13 to 16, a first positioning groove 0601 is disposed on the fixed main body 5, a sliding pin 09 is disposed in the first positioning groove 0601, and a second positioning groove 01021 and a third positioning groove 01022 are disposed on the drive rotary shaft 0102. When the fall protection device is reversely installed on the rail 006, and the drive rotary shaft 0102 rotates to one of the extreme positions, the first positioning groove 0601 corresponds to the second positioning groove 01021, such that the sliding pin 09 partly enters the second positioning groove 01021; and when the fall protection device is reversely installed on the rail 006, and the drive rotary shaft 0102 rotates to the other one of the extreme positions, the first positioning groove 0601 corresponds to the third positioning groove 01022, so that the sliding pin 09 partially enters the third positioning groove 01022.

When the fall protection device is installed normally, the sliding pin 09 is located in the first positioning groove 0601 of the fixed main body 5 under the action of gravity. At this time, there is no connection relationship between the sliding pin 09 and the drive rotary shaft 0102, and movement of the drive rotation axis 0102 does not be interfered. When the fall protection device is reversely installed, referring to FIGS. 13 and 14. in the two different forms, the first positioning groove 0601 corresponds to the second positioning groove 01021 and the third positioning groove 01022 on the drive rotary shaft, and the sliding pin 09 partially enters the second positioning groove 01021 or the third positioning groove 01022 under the action of gravity. At this time, the sliding pin 09 may prevent the drive rotary shaft 0102 from rotating, thereby making the installation of the fall protection device impossible.

Figure 9:
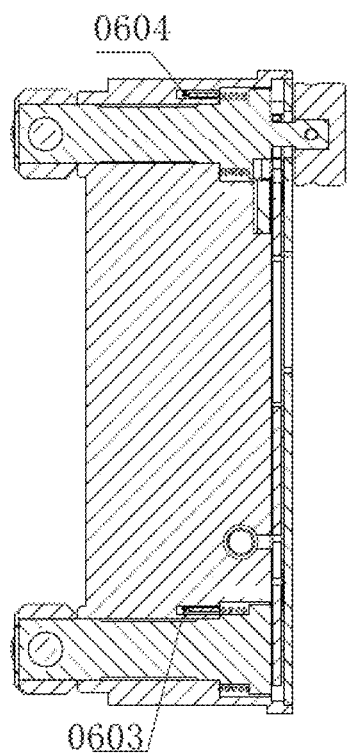
FIG. 9 is a schematic partial cross-sectional view of a fall protection device according to an embodiment of the present application.
Figure 15:
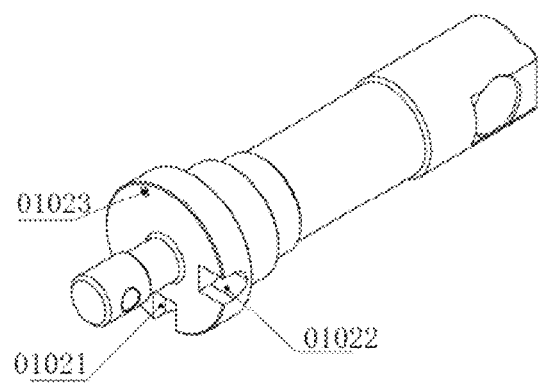
FIG. 15 is a schematic structural diagram of a drive rotary shaft according to an embodiment of the present application.

Referring to FIGS. 9, 15 and 16, for the fall protection device according to the embodiment of the present application, the fixed main body 5 is provided with a driven positioning hole 0603 and a drive positioning hole 0604. The fifth spring 0106 with a reset function is configured to be installed between the fixed main body 5 and the drive rotary shaft 0102, and between the fixed main body 5 and the driven rotary shaft 0201. For the second wheel body assembly 01, one end of the fifth spring 0106 is installed in a first reset hole 01023 on the drive rotary shaft 0102, and the other end of the fifth spring 0106 is installed in the drive positioning hole 0604 on the fixed main body 5 and configured to install the drive rotary shaft 0102 to the fixed main body 5. For the third wheel body assembly, one end of the fifth spring 0106 is installed in a second reset hole 02011 on the driven rotary shaft 0201, and the other end of the fifth spring 0106 is installed in the driven positioning hole 0603 on the fixed main body 5 and configured to install the driven rotary shaft 0201 to the fixed main body 5.

For the second wheel body assembly 01, the slider 0101 is installed on the drive rotary shaft 0102 through the mounting shaft 0108, and the roller 0107 and the positioning washer 0109 are installed on the mounting shaft 0108. For the third wheel body assembly 01, the slider 0101 is installed on the driven rotary shaft 0201 through the mounting shaft 0108, and the roller 0107 and the positioning washer 0109 are installed on the mounting shaft 0108.

According to an embodiment of a third aspect of the present application, referring to FIGS. 17 to 22, a fall protection system is provided, including a rail 006 and a fall protection device installed on the rail 006. In addition, the fall protection system also includes a carabiner 009 and a shock absorption device 0011.

Referring to FIGS. 17 and 20 to 22, the rail 006 includes a slider passage 00601, a running limit surface 00602, an outer support surface 00603, an inner support surface 00604, and a rail support surface 00605. The drive rotation member 0103 is rotated so that the fall protection device is switched between the two states shown in FIGS. 18 and 19. When the fall protection device is in the state shown in FIG. 19, the fall protection device may be installed to the rail 006, or the fall protection device may be detached from the rail 006 at this time. When the fall protection device is in the state shown in FIG. 18, the fall protection device may be fixed in the rail 006 at this time, so that the slider 0101 is located in the slider passage 00601 and runs along the slider passage 00601. In addition, when the fall protection device is installed on the rail 006, the fifth limit surface 505 on the fixed main body 5 runs in the running limit surface 00602, through which the fall protection device is restricted in the horizontal direction. When the fall protection device is running, the outer support surface 00603 is in contact with the roller 0107 installed on the upper part of the fixed main body 5, and the inner support surface 00604 is in contact with the roller 0107 installed on the running support slider 01012. When the fall protection device is locked up, the outer support surface 00603 is in contact with the roller 0107 installed on the lower part of the fixed main body 5, and the inner support surface 00604 is in contact with the roller 0107 installed on the lockup support slider 01011.

It is found from FIGS. 19-22 that, in addition to the first wheel body assembly 10, four pairs of wheel body assemblies are fixed on the fixed main body 5 according to an embodiment of the present application, including the above-mentioned second wheel body assembly 01 and the third wheel body assembly 02 for rolling along the inner support surface 00604 of the rail 006, and further including two pairs of wheel body assemblies for rolling along the outer support surface 00603 of the rail 006, and each of the four pairs of wheel body assemblies includes at least one pair of rollers 0107. In addition, a first wheel body assembly 10 is also installed on the fixed main body 5, and the first wheel body assembly 10 includes the above-mentioned rotation wheel 101. The rotation wheel 101 is in contact with the outer support surface 00603 in real time to monitor the running speed. The lockup of the fall protection device is provided by contacting the support surface of the locking lever 304 of the locking lever 3 with the rail support surface 00605 of the rail 006.

In the above-mentioned fall protection system, through the first trigger mechanism 1 and the second trigger mechanism 2, the locking lever 3 is triggered to prevent the fall protection device from running downwards relative to the rail 006 abnormally and interacts the rail 006 while it moves from the trigger position to the lockup position. One end of the shock absorption device 0011 is installed on the connecting hole 201, and the other end of the shock absorption device 0011 is connected with the carabiner 009.

The implementations above are only used to illustrate the present application, but not to limit the present application. Although the present application has been described in detail with reference to the embodiments, those skilled in the art should understand that various combinations, modifications, or equivalent substitutions of the technical solutions of the present application do not depart from the scope of the technical solutions of the present application, and should be covered by the scope of the claims of the present application.

The invention claimed is:

1. A fall protection locking assembly, comprising:
   a fixed main body, configured to be installed to a rail through a first wheel body assembly containing a wheel shaft;
   a lockup member installed on the fixed main body and switched between a lockup position and a free position; and
   a first trigger mechanism installed to the fixed main body, wherein the first trigger mechanism comprises a transmission member and a drive member, the transmission member is configured to be installed to the wheel shaft and rotate with the wheel shaft, and the transmission member is switched with changes in centrifugal force between a first position, in which the transmission member is disengaged from the drive member in the first position, and a second position, in which the transmission member transmits the rotation of the wheel shaft to the drive member so that the drive member rotates to drive the lockup member to move to the lockup position;
   wherein the transmission member is installed on the wheel shaft through a first elastic member, the first elastic member is in an original state in the first position, and is stretched in the second position; and
   the transmission member is trigger blocks, and a plurality of the trigger blocks are fixed to an outer surface of the wheel shaft through the first elastic member; the drive member is a cam, and the trigger blocks are disposed inside the cam, the trigger blocks forms a limiting portion being in limit fit with the inner surface of the cam in the second position.

2. The fall protection locking assembly of claim 1, wherein the lockup member is a locking lever being formed with a first trigger surface of the locking lever matched with the cam.

3. The fall protection locking assembly of claim 2, further comprising:
   a second trigger mechanism, installed on the fixed main body and comprising a swing lever that switches between a reset position, in which the swing lever drives the lockup member to move to the lockup position, and a force-bearing position.

4. The fall protection locking assembly of claim 3, wherein the swing lever comprises
   a trigger end and a free end, wherein the trigger end is connected to the fixed main body through a second elastic member, and the second elastic member is in an original state at the reset position and is compressed at the force-bearing position.

5. The fall protection locking assembly of claim 4, wherein the free end is formed with a connecting hole configured to connect the shock absorption device; the lockup member is a locking lever formed with a second trigger surface of the locking lever matched with the trigger end.

6. A fall protection device, comprising:
   the fall protection locking assembly of claim 1, and
   a first wheel body assembly installed on the fixed main body and configured to roll along a rail, the first wheel body assembly comprising a first wheel set and the first wheel set comprising the wheel shaft.

7. The fall protection device of claim 6, wherein the wheel shaft is installed to the fixed main body through a sliding mount base, the sliding mount base is connected to the fixed main body through a third elastic member, and the fixed main body is provided with a threaded fastener configured to adjust the third elastic member so that the sliding mount base drives the wheel shaft to move closer to or farther away from a mounting surface of the fixed main body.

8. The fall protection device of claim 6, further comprising:
   a second wheel body assembly installed on the fixed main body and configured to roll along an inner support surface of the rail, wherein the second wheel body assembly comprises a second wheel set connected to a drive rotary shaft and the drive rotary shaft is connected to a drive rotation member;

a third wheel body assembly installed on the fixed main body and configured to roll along an inner support surface of the rail, wherein the third wheel body assembly comprises a third wheel set connected to a driven rotary shaft; and a linkage member disposed between the drive rotary shaft and the driven rotary shaft.

9. The fall protection device of claim 8, wherein the drive rotation member is connected to the drive rotary shaft through a first pin; the linkage member is a linkage plate, and the drive rotary shaft is connected to the linkage plate through a second pin, the driven rotary shaft is connected to the linkage plate through a third pin, and the fixed main body is provided with a guide limit wheel of the linkage plate configured to limit the lateral movement of the linkage plate such that the linkage plate moves along the longitudinal direction.

10. The fall protection device of claim 9, wherein the linkage plate is provided with an L-shaped lockup hole, comprising a transverse hole section and a longitudinal hole section communicating with the transverse hole section; the fixed main body is provided with a fourth pin movable along the transverse hole section, and the linkage plate is locked when the fourth pin is located in the transverse hole section and is movable longitudinally when the fourth pin is located in the longitudinal hole section.

11. The fall protection device of claim 8, wherein the fall protection device comprises a limit mechanism configured to limit the rotation of the drive rotary shaft between two extreme positions, the drive rotary shaft is disposed longitudinally in one of the extreme positions and disposed horizontally at the other one of the extreme positions.

12. The fall protection device of claim 11, wherein the linkage member is a linkage plate, and the drive rotary shaft is connected to the linkage plate through a second pin; the fall protection device further comprises a cover of the linkage plate; the limit mechanism comprises the second pin and a limit hole formed on the cover, the second pin rotates in the limit hole, and the limit hole is configured that the second pin is in limit fit with the inner wall of the limit hole when the drive rotary shaft rotates to the extreme positions and the rotational angle of the drive rotary shaft is not greater than ninety degrees.

13. The fall protection device of claim 11, wherein the second wheel body assembly further comprises a slider, the slider is fixed to the drive rotary shaft, and the slider is formed with a mounting groove for the second wheel set; the limit mechanism comprises the slider and a protrusion formed on the fixed main body; the slider is in limit fit with the protrusion when the drive rotary shaft rotates to the extreme positions.

14. The fall protection device of claim 11, wherein a first positioning groove is disposed on the fixed main body, a sliding pin is disposed in the first positioning groove, and a second positioning groove and a third positioning groove are disposed on the drive rotary shaft; and the first positioning groove, the second positioning groove, and the third positioning groove are configured such that when the fall protection device is reversely installed on the rail, and the drive rotary shaft rotates to one of the extreme positions, the first positioning groove corresponds to the second positioning groove, such that the sliding pin partially enters the second positioning groove; and when the fall protection device is reversely installed on the rail, and the drive rotary shaft rotates to the other one of the extreme positions, the first positioning groove corresponds to the third positioning groove, so that the sliding pin partially enters the third positioning groove.

15. A fall protection system, comprising a rail, further comprising the fall protection device according to claim 6 installed on the rail.

\* \* \* \* \*